United States Patent
Borchers

(10) Patent No.: US 8,130,436 B2
(45) Date of Patent: Mar. 6, 2012

(54) FLEXURE ACTUATOR

(75) Inventor: Bruce Borchers, Scotts Valley, CA (US)

(73) Assignee: Prysm, Inc., San Jose, CA (US)

( * ) Notice: Subject to any disclaimer, the term of this patent is extended or adjusted under 35 U.S.C. 154(b) by 512 days.

(21) Appl. No.: 12/372,558

(22) Filed: Feb. 17, 2009

(65) Prior Publication Data

US 2010/0208322 A1    Aug. 19, 2010

(51) Int. Cl.
*G02B 26/08* (2006.01)
(52) U.S. Cl. ............ 359/224.1; 359/198.1; 359/199.1; 359/199.3; 359/200.7; 310/48; 310/208
(58) Field of Classification Search .... 359/198.1–199.4, 359/200.6–200.8, 224.1–224.2; 310/10, 310/27, 36, 40 R, 46, 48, 66, 152, 154.01, 310/154.02, 208
See application file for complete search history.

(56) References Cited

U.S. PATENT DOCUMENTS

| | | | | |
|---|---|---|---|---|
| 4,861,125 A | * | 8/1989 | Vaught | 359/199.1 |
| 2001/0036000 A1 | | 11/2001 | Nishikawa et al. | |
| 2008/0224557 A1 | * | 9/2008 | Cleveland | 310/156.43 |

FOREIGN PATENT DOCUMENTS

| | | |
|---|---|---|
| EP | 2175548 A2 | 4/2010 |
| JP | 2101422 A | 4/1990 |
| JP | 3150733 A | 6/1991 |
| WO | WO2007095329 A2 | 8/2007 |

OTHER PUBLICATIONS

UK Intellectual Property Office, Combined Search and Examination Report dated May 17, 2010, 6 pages with two citations for JP2101422, 4 page and JP3150733, 7 pages.

* cited by examiner

*Primary Examiner* — James Phan
(74) *Attorney, Agent, or Firm* — Perkins Coie LLP

(57) ABSTRACT

Implementations of actuators that use flexures to provide support to the actuators and pivoting mechanisms to the actuators. Such actuators can be electromagnetically activated actuators that include a magnet stator and a coil rotor mounted on a flexure.

18 Claims, 11 Drawing Sheets

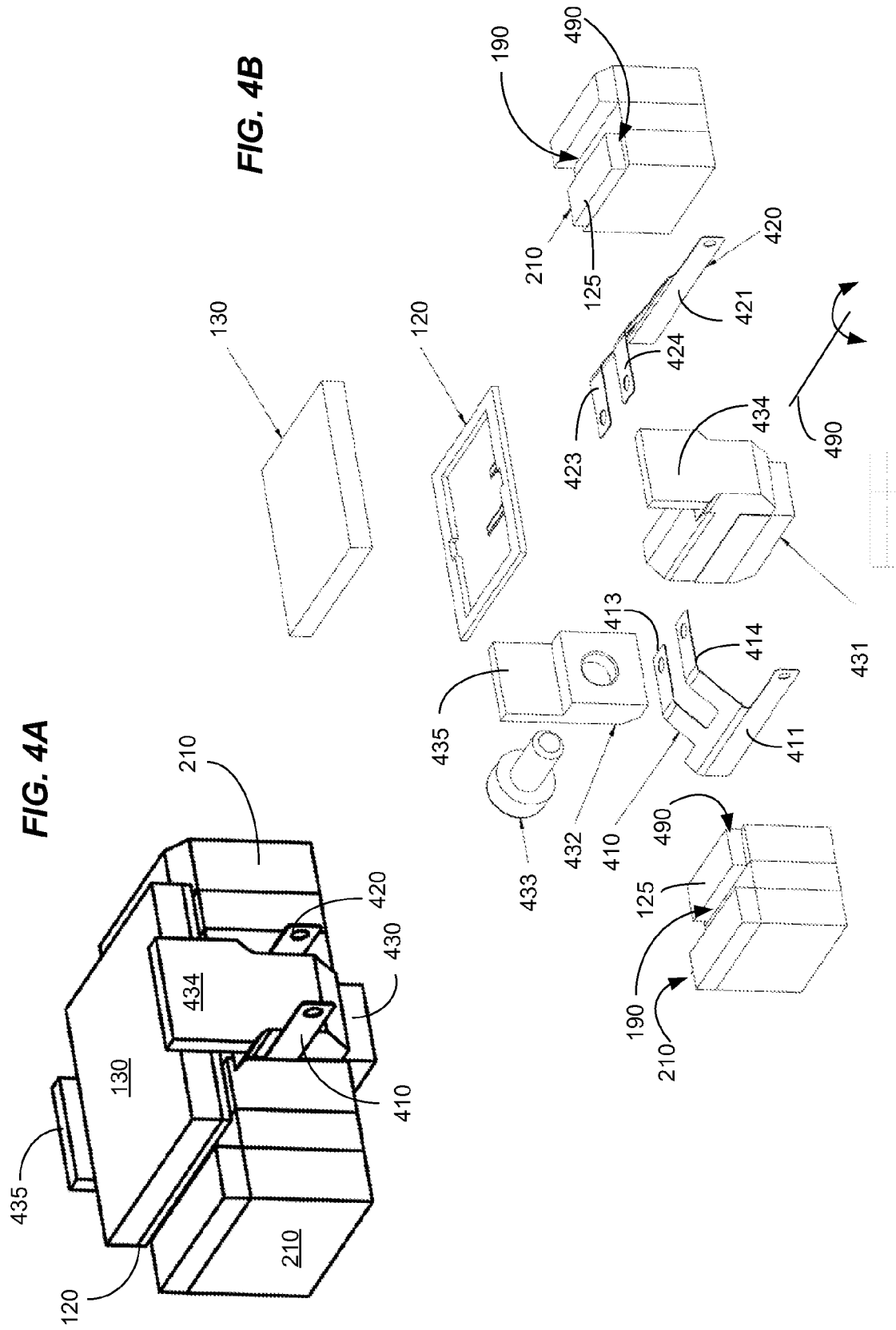

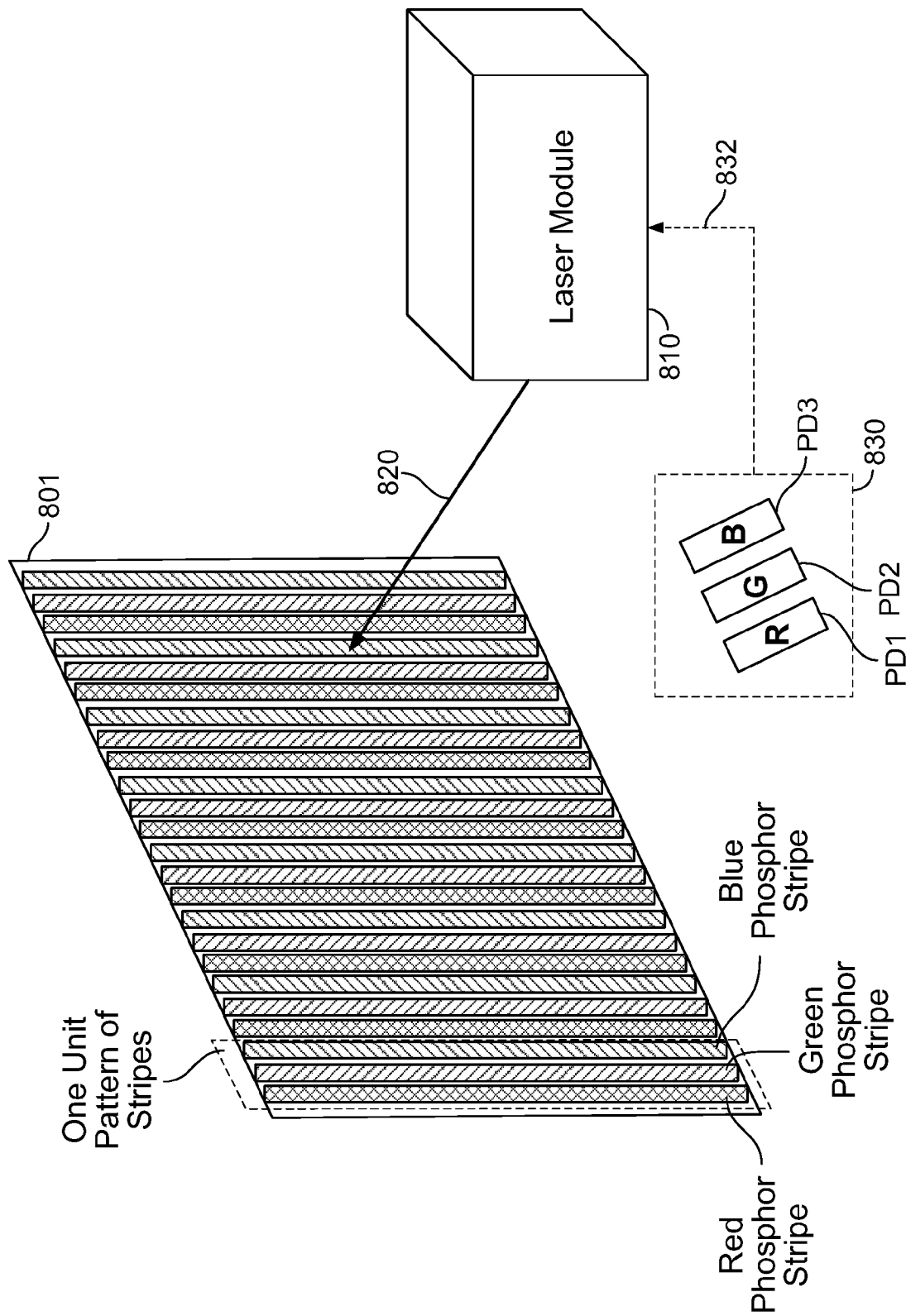

FLEXURE ACTUATOR

BACKGROUND

This document relates to actuators and applications of such actuators, including uses of such actuators in optical beam steering and scanning devices and systems.

Actuators are devices that can be activated by energy to cause motion or movement of a component. Electromagnetically activated actuators can be configured to use a current-carrying coil in a magnetic field to electromagnetically cause rotation of the coil by controlling the direction and amplitude of the current in the coil. Bearing based galvanometers are examples of such electromagnetically activated actuators with coils.

SUMMARY

This document provides exemplary implementations of actuators that use flexures to provide support to the actuators and pivoting mechanisms to the actuators. Such actuators can be electromagnetically activated actuators that include a magnet stator and a coil rotor mounted on a flexure. The flexure can be designed, in some implementations, to eliminate the need for support bearings that tend to suffer from mechanical wear or fatigue after repetitive uses, to provide repeatable positioning operations with reduced mechanical wear and fatigue. The flexure, and to achieve a high positioning accuracy at a fast response speed. The power consumption of such flexure actuators can also be significantly reduced or minimized in some implementations. Examples of applications of such actuators in optical steering and scanning are provided.

For example, a flexure actuator device is provided to include a support base, a first flexure including a first flexure base that is fixed to the support base and first flexure extensions that flex with respect to the fixed first flexure base and the support base, and a second flexure including a second flexure base that is fixed to the support base and one or more second flexure extensions that flex with respect to the fixed second flexure base and the support base. The second flexure is positioned and oriented to have the first and second flexure extensions to cross. This device also includes an actuator engaged to distal ends of the first and second flexure extensions to rotate around a single rotation axis as the first and second flexure extensions deform when the actuator is actuated to rotate. The actuator may be, for example, a conductor coil engaged to distal ends of the first and second flexure extensions and to rotate around the single rotation axis when an electrical current in the conductor coil electromagnetically interacts with a magnetic field present at the conductor coil.

For another example, a method for operating a flexure actuator device to direct light is provided to include directing an input laser beam to a mirror engaged to a flexure actuator device. This device includes a support base, first and second flexures, and a conductor coil engaged to the mirror to rotate with the conductor coil. The first flexure includes a first flexure base that is fixed to the support base and first flexure extensions that flex with respect to the fixed first flexure base and the support base. The second flexure includes a second flexure base that is fixed to the support base and second flexure extensions that flex with respect to the fixed second flexure base and the support base. The conductor coil is engaged to distal ends of the first and second flexure extensions to rotate around a single rotation axis as the first and second flexure extensions deform when an electrical current in the conductor coil electromagnetically interacts with a magnetic field present at the conductor coil. In this method, the electrical current is controlled to be at different current values to set the mirror at respective different orientations to reflect the input laser beam along different directions set by the different orientations of the mirror.

For another example, a display device is provided to include a light source to produce one or more laser beams that are modulated to carry images to be displayed, and a beam scanning module that scans the one or more laser beams along two different directions on a screen surface to display the images and comprises a first scanner to scan the one or more laser beams along a first direction and a second scanner to scant the one or more laser beams along a second, different direction. The first scanner includes a mirror and a flexure actuator device that engages the mirror to rotate the mirror for scanning the one or more laser beams along the first direction. The flexure actuator device includes a support base, first and second flexures, a conductor coil engaged to the mirror to rotate the mirror. The first flexure includes a first flexure base that is fixed to the support base and first flexure extensions that flex with respect to the fixed first flexure base and the support base. The second flexure includes a second flexure base that is fixed to the support base and second flexure extensions that flex with respect to the fixed second flexure base and the support base. The conductor coil is engaged to distal ends of the first and second flexure extensions to rotate around a single rotation axis as the first and second flexure extensions deform when an electrical current in the conductor coil electromagnetically interacts with a magnetic field present at the conductor coil.

For yet another example, an actuator device includes a conductor coil electrically connected to receive and carry an electrical current which electromagnetically interacts with a magnetic field present at the conductor coil to move the conductor coil, a coil support that is engaged to the conductor coil to confine movement of the conductor coil as a rotation around a rotation axis, a first Halbach magnet array of first permanent magnets located at a first side of the coil support to produce a first high magnetic flux density at a first side of the conductor coil, and a second Halbach magnet array of second permanent magnets located at a second, opposite side of the coil support to produce a second high magnetic flux density at a second side of the conductor coil. The first and second Halbach magnet arrays operate collectively to rotate the conductor coil around the rotation axis. The coil support may include, in one example, two flexures that are crossed with each other and are engaged to the conductor coil to confine the movement of the conductor coil to rotate around a location where the two flexures are crossed.

These and other examples, implementations and applications of electromagnetically activated actuators based on flexures are described in detail in the drawings, the detailed description and the claims.

BRIEF DESCRIPTION OF THE DRAWINGS

FIGS. 4A and 4B show an implementation of the electromagnetically activated actuator in FIGS. 1 and 2.

FIGS. 7A, 7B, 7C and 8 show examples of scanning display systems using the electromagnetically activated actuator in FIGS. 1 and 2.

DETAILED DESCRIPTION

Figure 1:
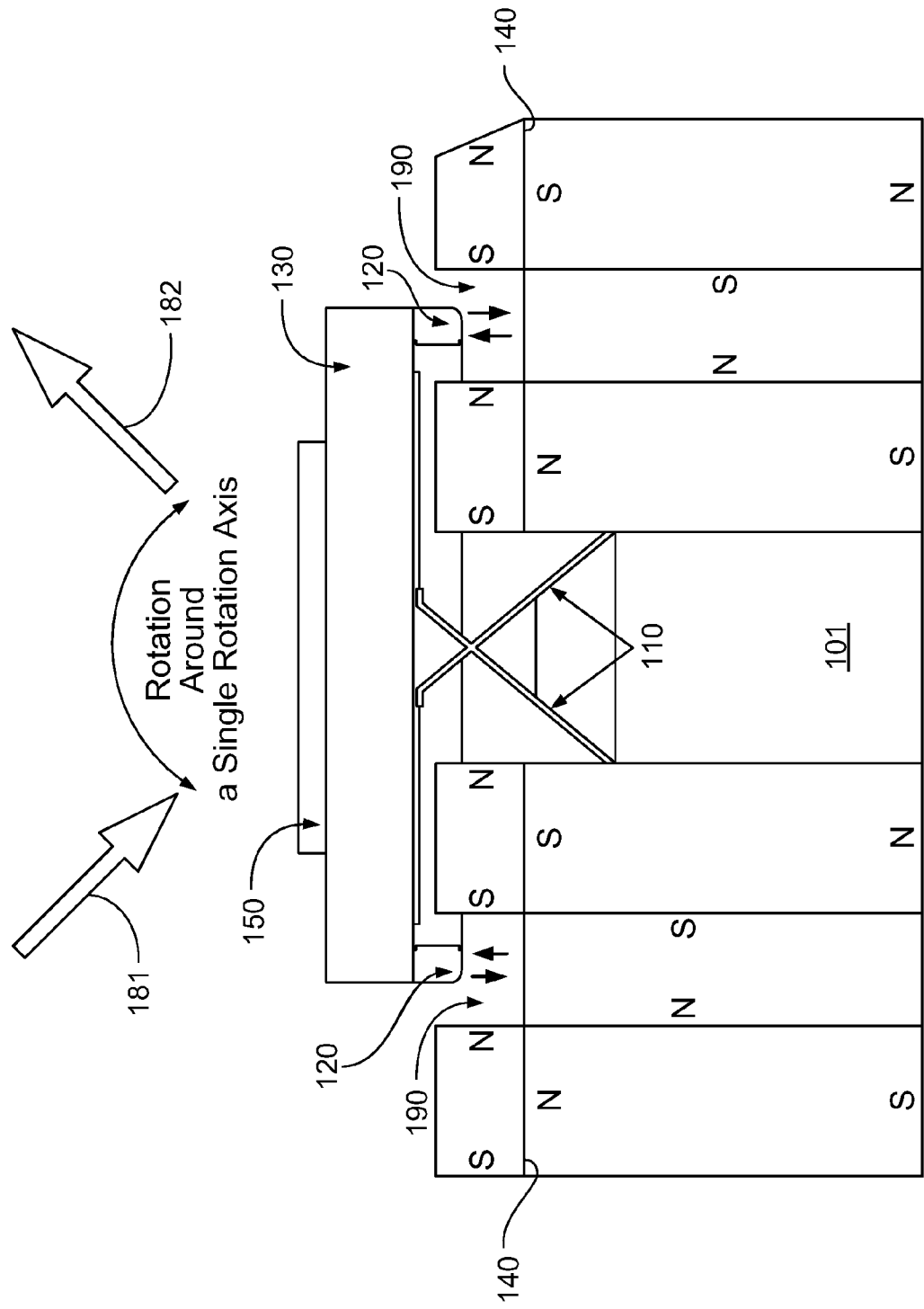
FIGS. 1 and 2 show two views of an example of an electromagnetically activated actuator with a magnet stator and a coil rotor mounted on a flexure.
Figure 2:
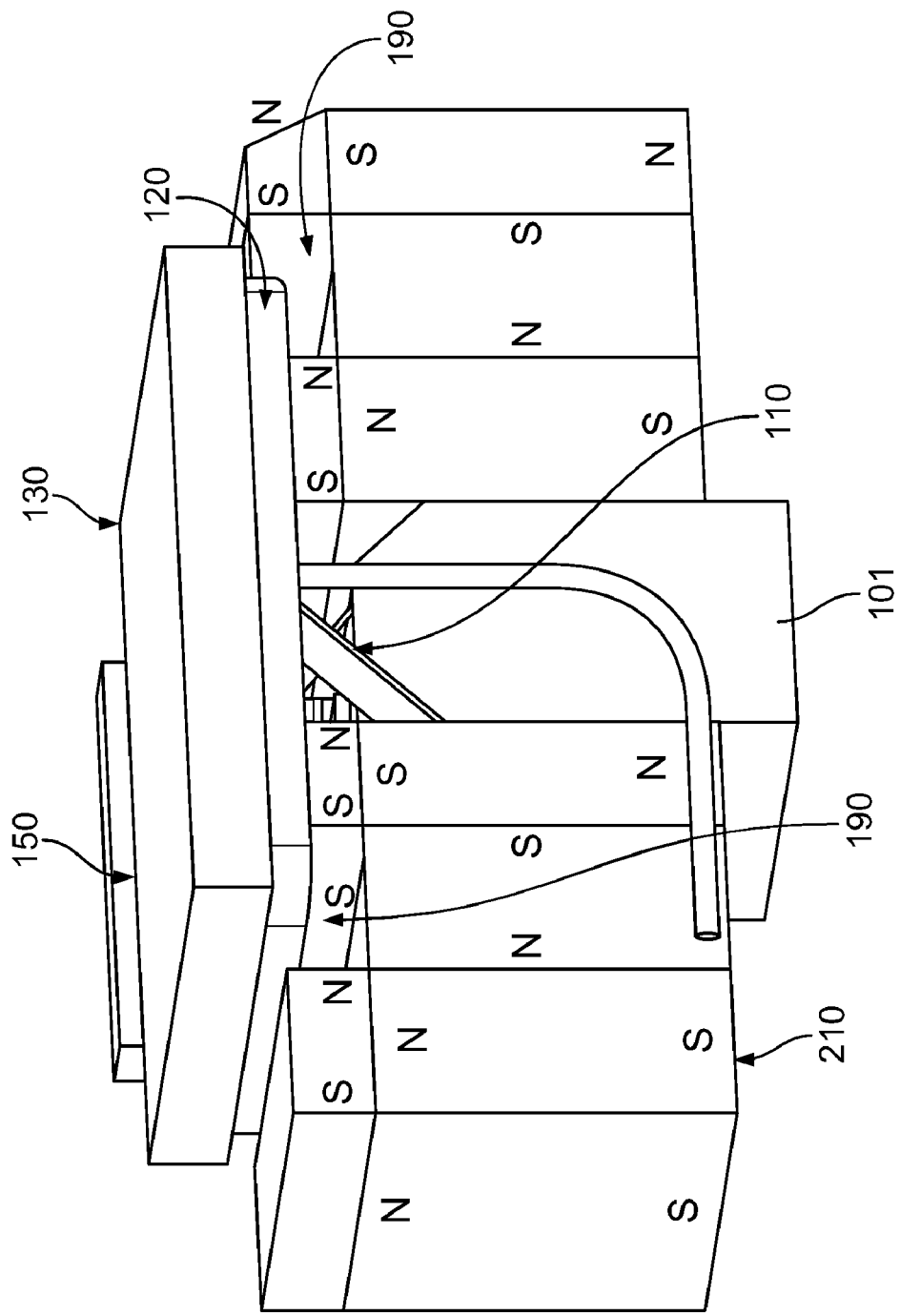

FIGS. 1 and 2 show two views of an example of an electromagnetically activated actuator device with a magnet stator and a coil rotor mounted on a flexure. The flexure is designed to provide support to the actuator and a pivoting mechanism to the actuator. The electromagnetically activated actuator based on a coil is an example of various actuator designs and other actuator designs can also be used with the present flexure design.

The illustrated actuator device includes a support base 101, a conductor coil 120 as a rotor, and a flexure 110 that connects to the coil 120 and the support base 101 to movably suspend the conductor coil 120 relative to the support base 101. A magnet module 140, which may include two Halbach magnet arrays, is fixed in position relative to the support base 101 to produce a magnetic field with a desired spatial field distribution pattern at the conductor coil 120 to electromagnetically cause the conductor coil 120 to rotate, in response to an electrical current that is supplied to the conductor coil 120, around a single rotation axis defined by the flexure 110 and the manner that the flexure 110 is engaged to the support base 101. The magnet module 140 has a groove 190 with magnetic materials as walls in which a side of the coil 120 is placed to be exposed to a high magnetic flux area inside the groove 190. In some implementations, the groove 190 is designed to be sufficiently large so that the side of the coil 120 in the groove 190 remains substantially inside the groove 190 at different orientations of the coil 120.

In this example, the support base 101 and the magnetic module 140 are separate components and are fixed in position relative to each other. In other implementations, the magnetic module 140 may be structured to produce the desired magnetic field at the coil 120 and to engage to the flexure 110 as a support base. The flexure 110 includes two different flexure parts in a cross configuration to provide the desired mechanical suspension of the conductor coil 120 and the desired constraint to the movement of the conductor coil 120 so that the conductor coil 120 rotates around the single rotation axis. In FIG. 1, the single rotation axis is perpendicular to the paper as marked by the arrowed line indicating the rotation. This flexure based design can be used to eliminate mechanical bearings, minimize rotational inertia, and can provide accurate positioning of the conductor coil 120 and a fast response speed.

Referring to FIG. 1, the magnet module 140 is designed to produce a dense magnetic flux density at the location of the conductor coil 120 and the electromagnetic interaction of the current flowing inside the conductor coil 120 and the magnetic field of the magnet module 140 causes the conductor coil 120 to rotate. The current is controlled to change its magnitude and thus to control the rotation of the conductor coil 120. The direction of the rotation of the conductor coil 120 is controlled by changing the direction of the current inside the conductor coil 120. In one implementation, the magnet module 140 can include two permanent magnet modules placed on two sides of the support base 101. As an example, multiple magnets may be used to form a Halbach array 210 in FIG. 2 for each of the two modules 140 to produce a dense magnetic flux density at the coil 120. The two Halbach arrays 210 are structured to have opposite polarity in their magnetic fields. Therefore, with the current flowing in one direction inside the coil 120, one of the two magnet modules 210 has a magnetic attraction to the coil induced field, where the other magnet module 210 is set to repel the coil induced field. The result is the teeter-totter effect to efficiently generate a force and a torque on the conductor coil 120.

Figure 3:
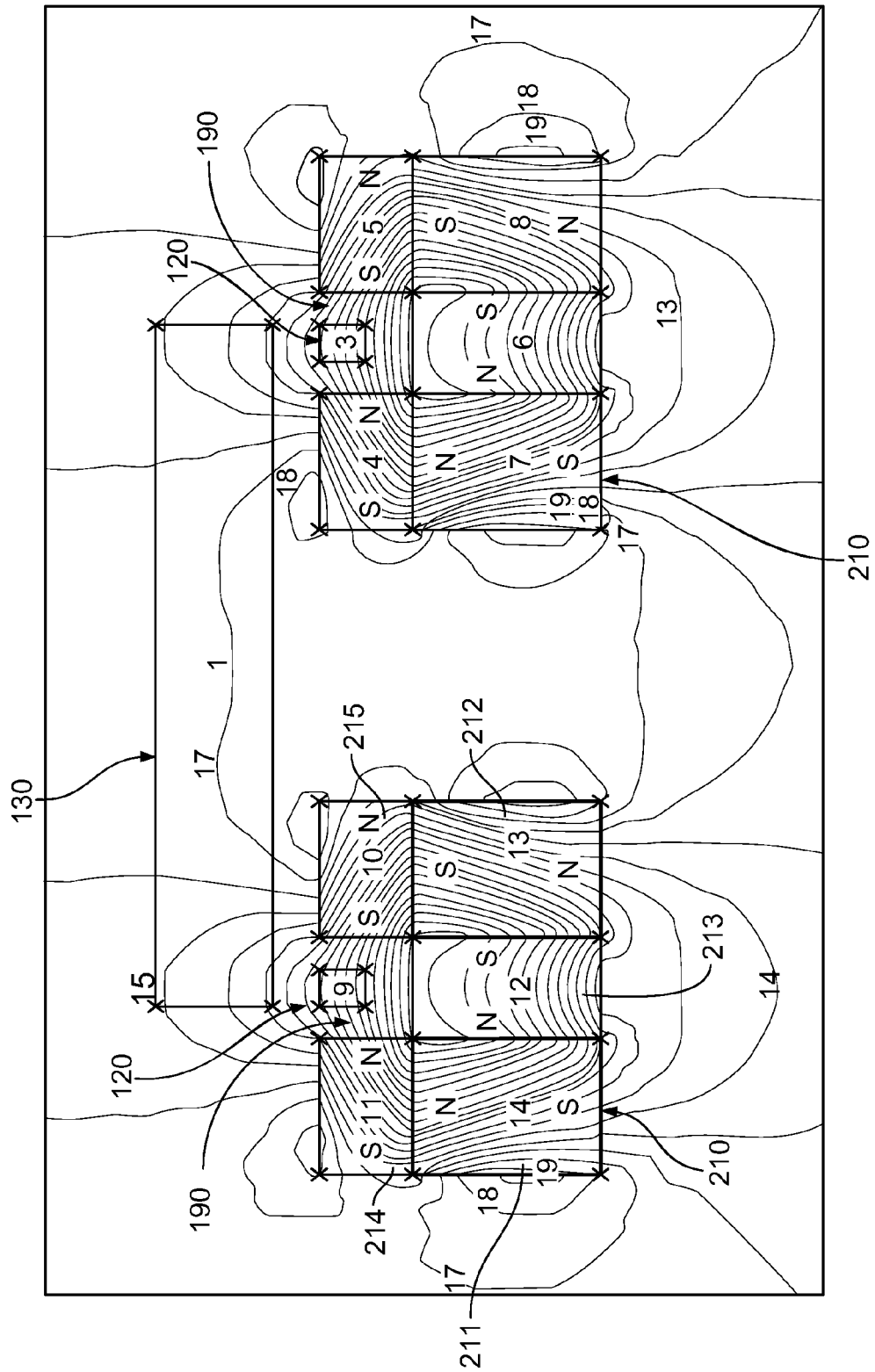
FIG. 3 shows operations of the magnet module and the conductor coil in the actuator in FIGS. 1 and 2.

FIG. 3 shows an example of using two Halbach arrays 210 in FIG. 2. Each Halbach array 210 is formed by five permanent magnets 211, 212, 213, 214 and 215. The magnetic polarities (indicated by "N" and "S") of the give permanent magnets 211, 212, 213, 214 and 215 are arranged as shown to produce desired high magnetic flux densities at the two parallel sides of the coil 120 to exerting a torque on the coil 120 to rotate. Each Halbach array 210 includes three magnets 211, 212 and 213 on the bottom and two top magnets 214 and 215 that are positioned on top of the bottom magnets 211, 212 and 213. The two top magnetic 214 and 215 are spaced from each other to form the groove 190 which is a cavity indent surrounded by permanent magnets 214, 215 and 213. The spatial distribution of the magnetic flux is illustrated, showing the highest flux density inside the groove 190 where a respective side of the coil 210 is located. In some implementations, the dimensions of the magnets 214 and 215 and the spacing between the magnets 214 and 215 are set to render the groove 190 to be sufficiently large so that the side of the coil 120 in the groove 190 remains substantially inside the groove 190 at different orientations of the coil 120. The sizes, dimensions and locations of the five permanent magnets are designed with respect to one another to produce a strong magnetic field flux density at two opposite sides of the coil 120 to change the orientation of the coil 120 at a high speed. This design of using two Halbach arrays with a conductor coil to form an electromagnetic actuator is advantageous than various other galvanometer designs because the two Halbach arrays are configured to provide efficient electromagnetic interactions between the magnets and the coil. Other designs may also be used.

In FIGS. 1 and 2, a damper 150 is provided between the support base 101 and the conductor coil 120 to dampen a motion of the conductor coil 120 relative to the support base 101. Two such dampers 150 may be provided on two opposite sides of the conductor coil 120 to provide symmetric damping.

Such an actuator in FIGS. 1 and 2 can be used in various applications. As an example, FIGS. 1 and 2 show a mirror 130 engaged to the conductor coil 120 so that the mirror 130 rotates with the conductor coil 120 around the single rotation axis. This actuated mirror device can be used to steer or scan an optical beam in, e.g., a beam scanning device such as scanning a laser beam in a scanning beam display system described in this document. As shown in FIG. 1, an input beam 181 is directed onto the mirror 130 and is reflected by the mirror 130 as an output beam 182 along a desired output direction dictated by the orientation of the mirror 130. When the input beam 181 is at a fixed input direction to the mirror 130, the rotation of the mirror 130 changes the output direction of the output beam 182.

FIGS. 4A and 4B show an exemplary implementation of the actuator shown in FIGS. 1 and 2. FIG. 4A shows the assembled actuator and FIG. 4B is an exploited view of the actuator to show various components or parts of the actuator.

In this example, the flexure 110 in FIGS. 1 and 2 is implemented as a two-part flexure assembly: a first flexure 410 and a second flexure 420. This two-part flexure assembly is engaged to a support base 430 as an example of the support base 101 in FIGS. 1 and 2. The first flexure 410 includes a first flexure base 411 that is fixed to the support base 430 and two first parallel flexure extensions 413 and 414 that flex with respect to the first flexure base 411 and the support base 430. The first flexure base 411 in this example is elongated along the single rotation axis 490 of the conductor coil 120 to provide rigidity against any motion of the first flexure 410 in a direction different from the single rotation axis. The two first parallel flexure extensions 413 and 414 are elongated along a direction that is perpendicular to the single rotation axis conductor coil 120 to flex around the first flexure base 411.

Similarly, the second flexure 420 includes a second flexure base 421 that is fixed to the support base 430 and two second parallel flexure extensions 423 and 424 that flex with respect to the second flexure base 421 and the support base 430. The second flexure base 421 in this example is elongated along the single rotation axis of the conductor coil 120 to provide rigidity against any motion of the second flexure 420 in a direction different from the single rotation axis. The two second parallel flexure extensions 423 and 424 are elongated along a direction that is perpendicular to the single rotation axis conductor coil 120 to flex around the second flexure base 421. Alternatively, the second flexure 420 may include the second flexure base and one flexure extension that flexes with respect to the second flexure base 421, or may include three or more flexure extensions.

The first and the second flexures 410 and 420 are positioned and oriented to have the first flexure extensions 413 and 414 to spatially cross with the second flexure extensions 423 and 424 so that the actuator engaged to the distal ends of the first and second flexure extensions rotate or pivot approximately around the location of the cross. In the illustrated example, the first and the second flexures 410 and 420 are positioned and oriented to have the first flexure extensions 413 and 414 to spatially interleave with the second flexure extensions 423 and 424 in position along a direction parallel to the direction of the single rotation axis. Under the cross configuration, the conductor coil 120 is engaged to distal ends of the first and second flexure extensions 413, 414, 423 and 424 to rotate around the single rotation axis as the first flexure extensions 413 and 414 counter act to the second flexure extensions 423 and 424 and vice versa when the conductor coil 120 is in motion. When viewed along the single rotation axis, the first flexure extensions 413 and 414 and the second flexure extensions 423 and 424 cross one another as shown in FIG. 1. As illustrated, the distal ends of the first flexure extensions 413 and 414 that are engaged to the conductor coil 120 are located above the second flexure base 421, and the distal ends of the second flexure extensions 423 and 424 that are engaged to the conductor coil 120 are located above the first flexure base 411. Therefore, the crossed flexures 410 and 420 provide a bearing-free pivoting mechanism by crossing two flexures 410 and 420 of equal lengths for the flexure extensions 413, 414, 423 and 424 and having one side of the cross flexures to be attached to the stationary base 430 and the other sides to be joined onto the free floating platform of the conductor coil 120. In operation, if the conductor coil 120 is tilted by the electromagnetic interaction between the current in the coil and the magnetic field, one side of the conductor coil 120 is pulled down as the other side is pushed up so that the pulled-down side of the conductor coil 120 causes the one flexure side to bend down while causing the other flexure side to be up. The mutual pressures constrain the rotational tilt motion of the conductor coil 120 and the friction associated with the rotation of the coil 120 is negligibly small because the flexure design is free of a friction between two components moving relative to each other as the conductor coil 120 rotates. This aspect allows the device to consume low power and requires a minimal counter-force to maintain the tilt of the conductor coil 120 when holding the conductor coil 120 at a fixed position. To reduce the overall mass to be moved by the actuator, the coil 120 can be directly attached to the mirror 130. To further reduce added materials and the mass of the actuator, the flexures 410 and 420 are electrically connected to the coil 120 for directing the current flow to and from a current generator that supplies the current to the coil 120.

The crossed flexures 410 and 420 in FIGS. 4A and 4B are designed to allow the coil-mirror assembly to rotate around one axis. The remaining five degrees of freedom of motion are constrained by the flexure geometry. The off axis stiffness of the flexures 410 and 420 can be designed to be much higher than the stiffness around the single rotation axis, e.g., about 1,000 times greater than the on axis stiffness. This can be achieved by designing the shape of the flexure bases 411 and 421, the engagement of the flexure bases 411 and 421 to the support base, and the widths of the flexure extensions 413, 414, 423 and 424 to achieve a desired aspect ratio of the flexure cross section and thus the large difference between the off-axis stiffness and the on-axis stiffness. The flexure design can be configured to keep the parasitic resonance at high frequencies, e.g., greater than 12 KHz.

This flexure actuator design can be used to achieve one or more advantages in implementations. For example, this flexure actuator design can be used to eliminate a motor shaft, moving magnets, and bearing assemblies to reduce friction in the actuator operation and the rotational inertia of the actuator. For another example, the cross flexure can be structured to mitigate mechanical wear in bearing or bushing used in some other actuator designs. By minimizing stress in the flexures during deflection, the cross flexure design can be configured to operate at low actuation/holding torques, to have a high parasitic resonance, a low rotational inertia, a low flexure stresses when deflected and to keep the stress below the endurance limit of the flexure material for a practically near infinite operating life. In addition, the cross flexures can be used as coil leads to conduct the electrical current to the coil 120 to minimize or avoid use of flexible leads that are used for conducting the current for coils in other designs. This use of the cross flexures as coil leads can further enhance the reliability of the actuator device because flexible leads are subject to mechanical fatigue due to movement of the flexible leads with the coil and the fatigue can lead to breakage of the flexible leads.

The support base 430 shown in FIG. 4A includes several components as shown in FIG. 4B. The support base 430 has two support base parts 431 and 432 that are engaged to each other by a fastener 433, e.g., a cap head screw. The flexure bases 411 and 421 are engaged to the support base part 431 in this example. Referring to FIG. 4A, the support base 430 includes two protruded extensions 434 and 435 on the opposite sides of the conductor coil 120 and the mirror 130. A first damper is located between and in contact with the protruded extension 434 and the first side surface of the coil 120 or the mirror 130 to dampen a motion of the conductor coil 120 relative to the support base 430. A second damper is located between and in contact with the protruded extension 435 and the side surface of the coil 120 or the mirror 130 to dampen the motion of the conductor coil 120 relative to the support base 430. Such dampers are represented by the part 150 in FIGS. 1 and 2 and can be made from a gel, a silicone damping material, or other suitable materials.

The flexure based actuator in FIGS. 4A and 4B can be designed to quickly and accurately move from one position to another position in a tilt-rotated manner. The flexure design allows a stationary and stable positional state and provides minimal power consumption to maintain the stationary stable positional state. This actuator can perform repeatable rotation operations without degradation of the performance. For example, a fast operation time less than 100 μs can be achieved in transitioning the actuator between either of two pre-determined mirror positions. The cross flexure design can be used to achieve a small angular rotation (e.g., 0.06 degrees) and a fine angular resolution, e.g., 0.0006 degrees or about 10 μrad. The average power consumption of the actuator can be low, e.g., 0.6 watts. A relatively large payload can be used with this design, e.g., a 9 mm×9 mm mirror that weights about 0.2 grams. The conductor coil 120 may have multiple conductor windings (e.g., 15 turns) to provide sufficient torque due the electromagnetic interaction between the coil 120 and the magnetic field of the magnetic module 140. In some implementations, the mirror 130 can be maintained at a steady state position to better than 0.00006 degrees or about 1 grad, while maintaining an average hold current of less than 50 mA plus or minus perturbations caused by the feedback mechanism as described below. The lifetime for such a flexure can be practically infinite and the life of the actuator using such a flexure may depend on the life of the engagement mechanism for the flexure, such as the adhesive used, and other components such as the laser diode used for optical monitoring of the flexure-mirror assembly for a feedback control described below. A long lifecycle of more than $10^{13}$ cycles for such an actuator should be achievable.

FIG. 4B further shows that the permanent magnet 125 of the Halbach array 210 that is located inside the loop of the coil 120 has a cut out feature 490 at each of the two opposite ends of the magnet 150. These cut out features 490 are provided to further enhance the magnetic flux density inside the groove 190 to provide high-speed switching operations of the coil 120.

Figure 5A:
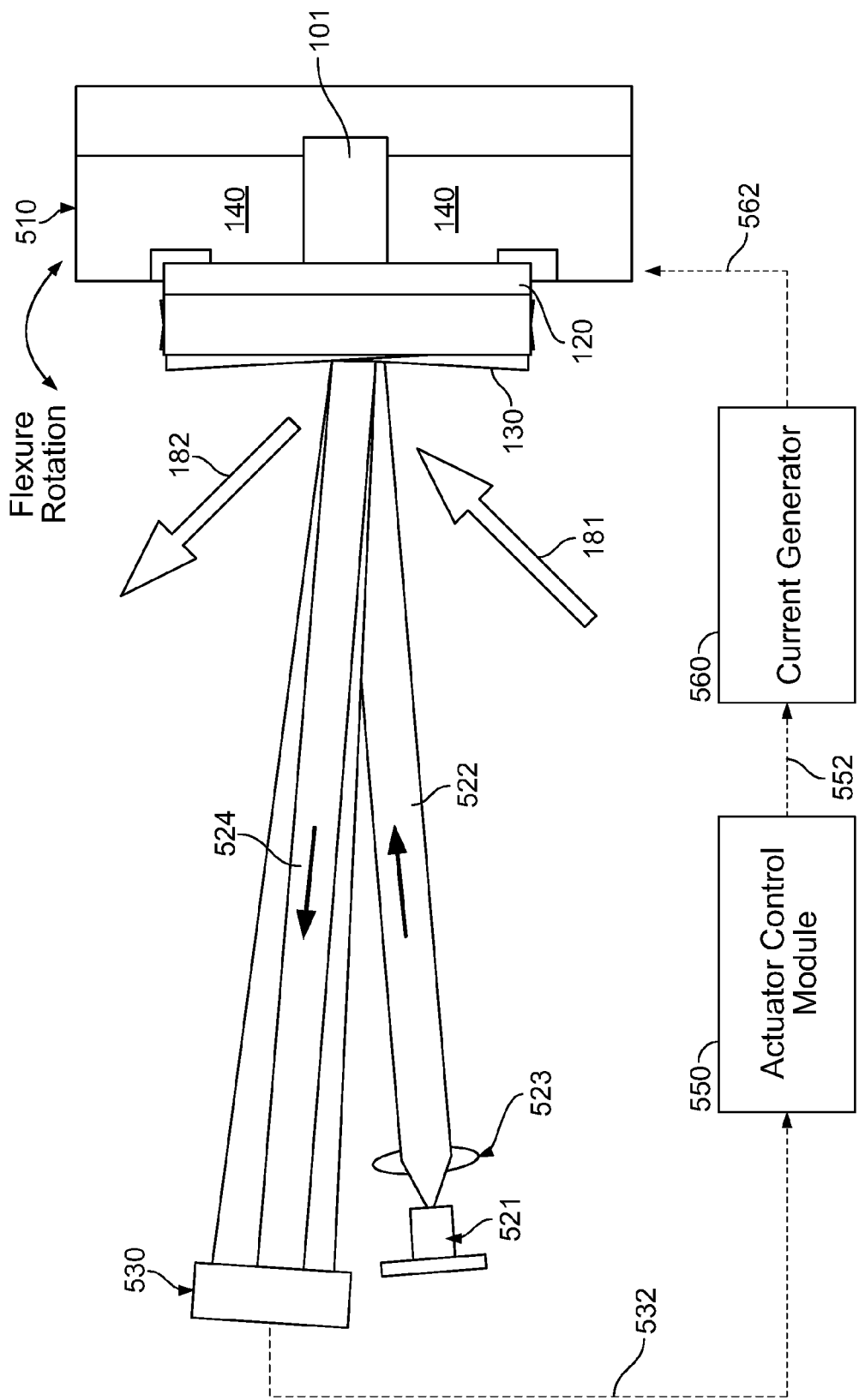
FIGS. 5A and 5B illustrate an example of an actuator feedback control for an actuator-mirror assembly based on the designs in FIGS. 1-4B.
Figure 5B:
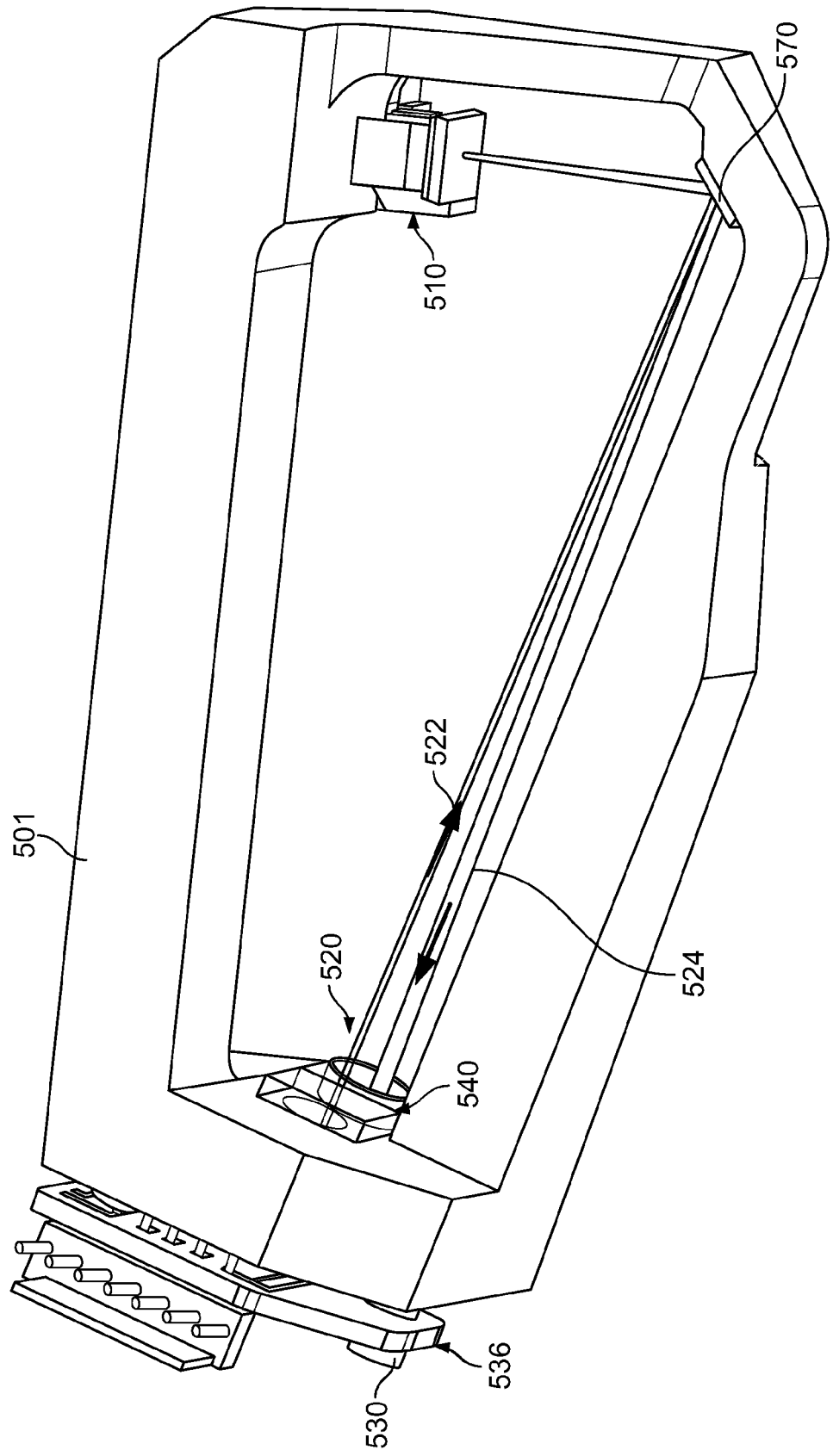

In some applications, the flexure-based actuator may include a feedback control mechanism that monitors the orientation of the actuator and provides a feedback signal to stabilize the actuator position at a desired position against any fluctuations or drifts in the actuator position. FIGS. 5A and 5B illustrate an example of an actuator feedback control for an actuator-mirror assembly based on the designs in FIGS. 1-4B.

Referring to FIG. 5A, the feedback control for a flexure-based actuator-mirror assembly 510 includes a laser diode 521 that produces a monitoring laser beam 522 towards the mirror 130. A collimation lens 523 may be used to collimate the laser beam 522. This monitoring laser beam 522 is different from and is an addition to an optical beam to be redirected by the mirror 130. The monitoring laser beam 522 can be at a wavelength different form the wavelength of the optical beam to be redirected by the mirror 130. For example, if the optical beam to redirected by the mirror 130 is a visible beam, the monitoring laser beam 522 may be an invisible beam, e.g., an IR beam. Upon reflection by the mirror 130, the reflected beam 524 is directed into a position sensitive detector (PSD) 530 that is located at a fixed known location with respect to the flexure-based actuator-mirror assembly 510. The positions of the laser diode 521 and PSD 530 are fixed relative to the flexure-based actuator-mirror assembly 510 so that each position of the beam 524 on the sensing surface of the PSD 530 corresponds to a particular orientation of the mirror 130. As such, the position of the beam 524 on the PSD 530 can be used to measure the orientation of the mirror 130. Therefore, if the orientation of the mirror 130 deviates from a desired orientation, the actual beam position of the beam 524 on the PSD 530 deviates from a desired beam position on the PSD 530. This difference in position on PSD 530 can be used as an error signal to adjust the mirror 130 to reduce the error.

In FIG. 5A, the feedback control includes an actuator control module 550 that receives the PSD output 532 from the PSD 530. The control module 550 compares the beam position on the PSD 530 in the received PSD output 532 to a desired beam position on the PSD 530 and determines an error in the PSD position for the beam 524. Based on this error, the control module 550 generates a control signal 552 to a current generator 560 that supplies the electric current 562 to the conductor coil 120 to adjust the orientation of the conductor coil 120 and thus the orientation of the mirror 130 to reduce the error. As illustrated, an input beam 181 is directed onto the mirror 130 and is redirected by the mirror 130 as an output beam 182. The beams 522 and 524 which are used for monitoring the orientation of the mirror 130 so that the input beam 181 can be redirected as the output beam 182 at a desired output direction at a given moment.

Turning to FIG. 5B, a support frame 501 is provided to hold the PSD 530 on a photo detector board 536, the laser diode 521, the flexure-based actuator-mirror assembly 510 in fixed positions relative to one another. An optical sensor filter 540 may be inserted in front of the PSD 530 to filter the light so that only the light of the feedback monitoring laser beam 524 is received by the PSD 530 while other light, such as light from the beams 181 and 182 shown in FIG. 5A, is rejected by the filter 540. The laser diode 521 and the collimation lens 523 can be included in a laser diode-lens assembly 520 mounted on the support frame 501. An extension mirror 570 on the support frame 501 can be used to guide light of the beams 522 and 524 between the flexure-based actuator-mirror assembly 510 and the PSD 530 and the laser diode-lens assembly 520. This extension mirror 570 may be used to increase the optical path length from the laser diode-lens assembly 520 to the assembly 510 and to the PSD 530 to increase the change of the beam position of the feedback monitoring laser beam 524 on the PSD 530 with respect to a change in the tilt of the mirror 130 in the assembly 510.

Figure 6:
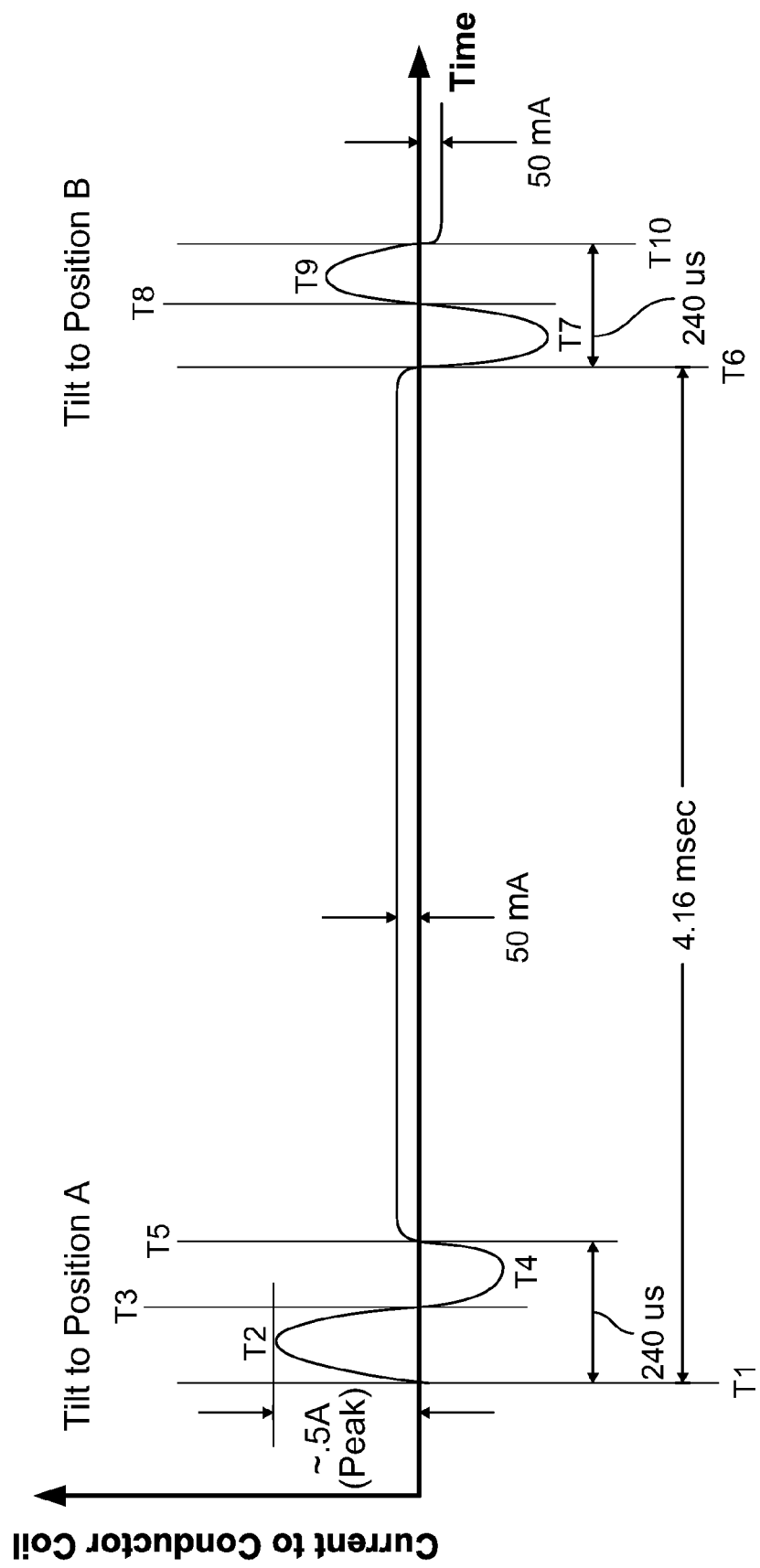
FIG. 6 shows an operation of the electromagnetically activated actuator in FIGS. 1 and 2.

In operating the flexure actuator described in this document, the electrical current supplied to the conductor coil 120 can be controlled, prior to setting the electrical current to a desired fixed value for achieving a desired mirror orientation, to reverse the direction of the electrical current from a desired direction of the electrical current for achieving the desired mirror orientation. This operation can be used to reduce over shoot of the mirror 130 beyond the desired mirror orientation. FIG. 6 illustrates an example of this current control operation for setting the mirror 130 in two orientations. Referring back to FIG. 5A, when the flexure is in a first position, the feedback monitoring laser beam 524 is to be at a beam position on the PSD 530 of the first pre-identified target point and when the flexure is in the second position, the feedback monitoring laser beam 524 is to be at a second beam position on the PSD 530 corresponding to the second pre-identified target point. Any offset form either point is used in the feedback loop to the current driven through the coil windings creating offset positioning of the steady state position of the mirror.

In the example shown in FIG. 6, the nominal steady state current through the winding is nearly 50 mA. If one of the target positions is near the power off position of the flexure module, then the steady state current may be less. By integrating the actuator and sensor into a rigid assembly ultra stable angular measurement can be achieved. For example, the flexure assembly can be designed with a first parasitic resonance at 12 Khz, but the current through the windings is set at a transition speed of 4 Khz below the first parasitic resonance, so from the first mirror position to the second mirror position current flows in one direction through the windings up to 1 A for 60 usec to accelerate the rotation of the mirror to the second position, followed immediately by a transition to a second reverse current through the windings of again up to 1 A, then the current is altered to achieve the steady state position for the mirror which may be nearly 50 mA based on the final position of the mirror. The maximum current applied to accelerate the mirror and then decelerate the mirror is based on position of the mirror in terms of the expected stress of the flexures. The current first and second polarity is based on the direction of the rotation in relation to the winding orientation in the coil to the two magnets. Mechanical and/or electronic damping can be used to minimize first resonance ringing in the actuator. In this implementation a gel is used on the edge of the platform to help dampen movement and better retain a stable stationary position.

In FIG. 6, the switching period between the two mirror positions A and B is 4.16 msec. The current through the coil winding is sent at time T1 in one polarity (e.g. positive) of a current approximately 0.5 A peak. To slow the tilt motion of the mirror, the current is reduced beginning at time T2. To decelerate the tilt of the mirror, a reverse current is applied at time T3 to a max reverse current at time T4, where the current returns to a stable state at time T5. Here the current is at a normalized value to hold the mirror in place, where the current is applied to create an electromagnetic force to counter the force of the bent-to-position flexure. This steady state current is modulated by the feedback circuit to correct for any drift of the flexure-mirror platform or a variation in the input laser beam directed to the mirror. The current mostly normalizes to a steady state current of typically 50 mA. The reverse action takes place to tilt the mirror back from the position A to position B. This process begins with a current in the opposite direction of the steady current used for holding the coil at the position A at time T6, reduces the magnitude of the applied current after reaching at a peak of 0.5 A at time T7, reverses the direction of the current at T8 to increase the current amplitude to a peak at T9, and then reduces the magnitude to ultimately reach a steady state current at time T10 for holding the mirror at a steady state position B.

Among various applications that can implement the present flexure-based actuator, the following examples describe scanning-beam systems for producing optical patterns by using two beam scanners to scan one or more optical beams in raster scanning patterns. Many laser printing systems use a scanning laser beam to print on a printing surface of a printing medium (e.g., paper). Some display systems use 2-dimensionally scanned light to produce images on a screen.

Figure 7A:
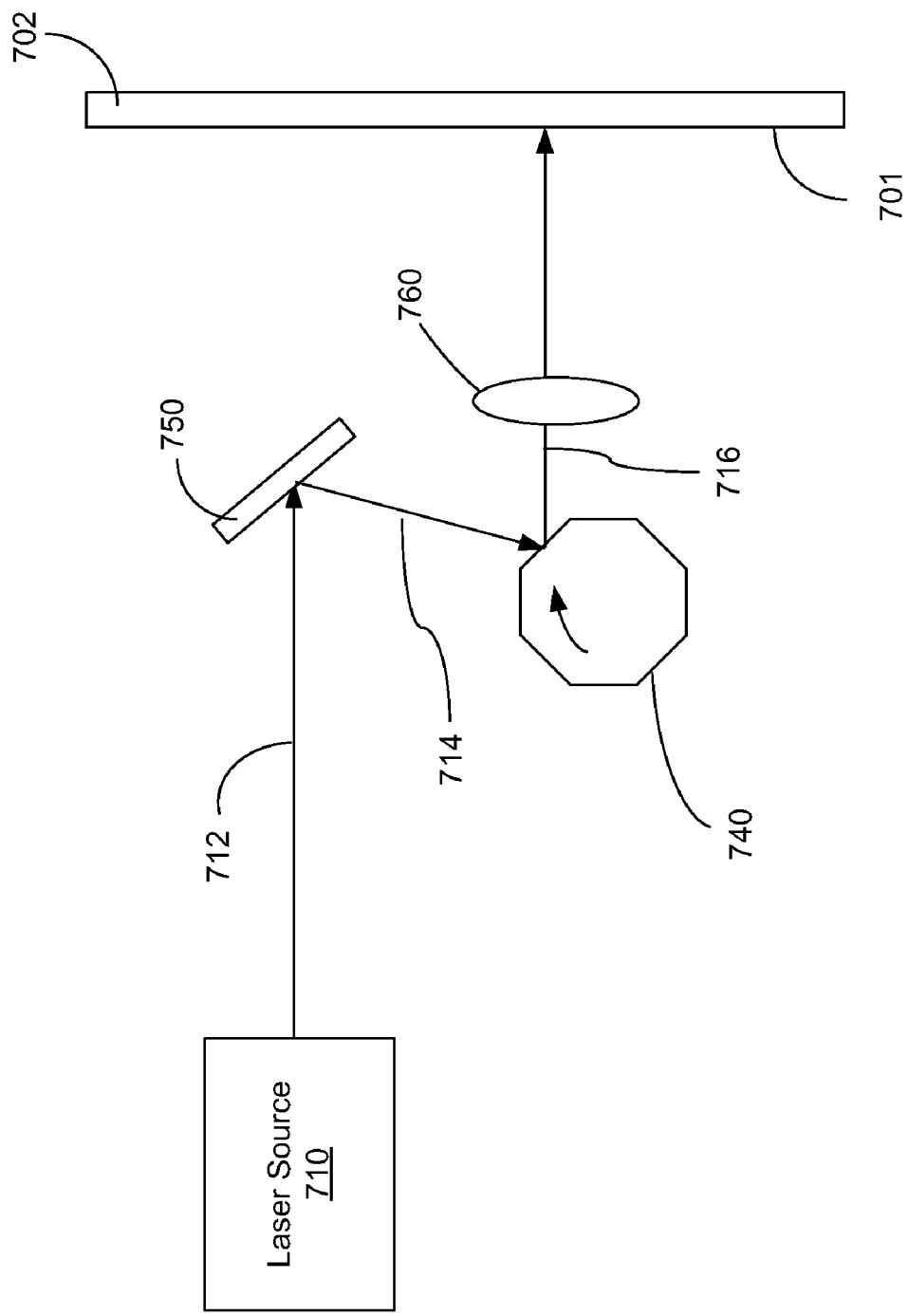
Figure 7B:
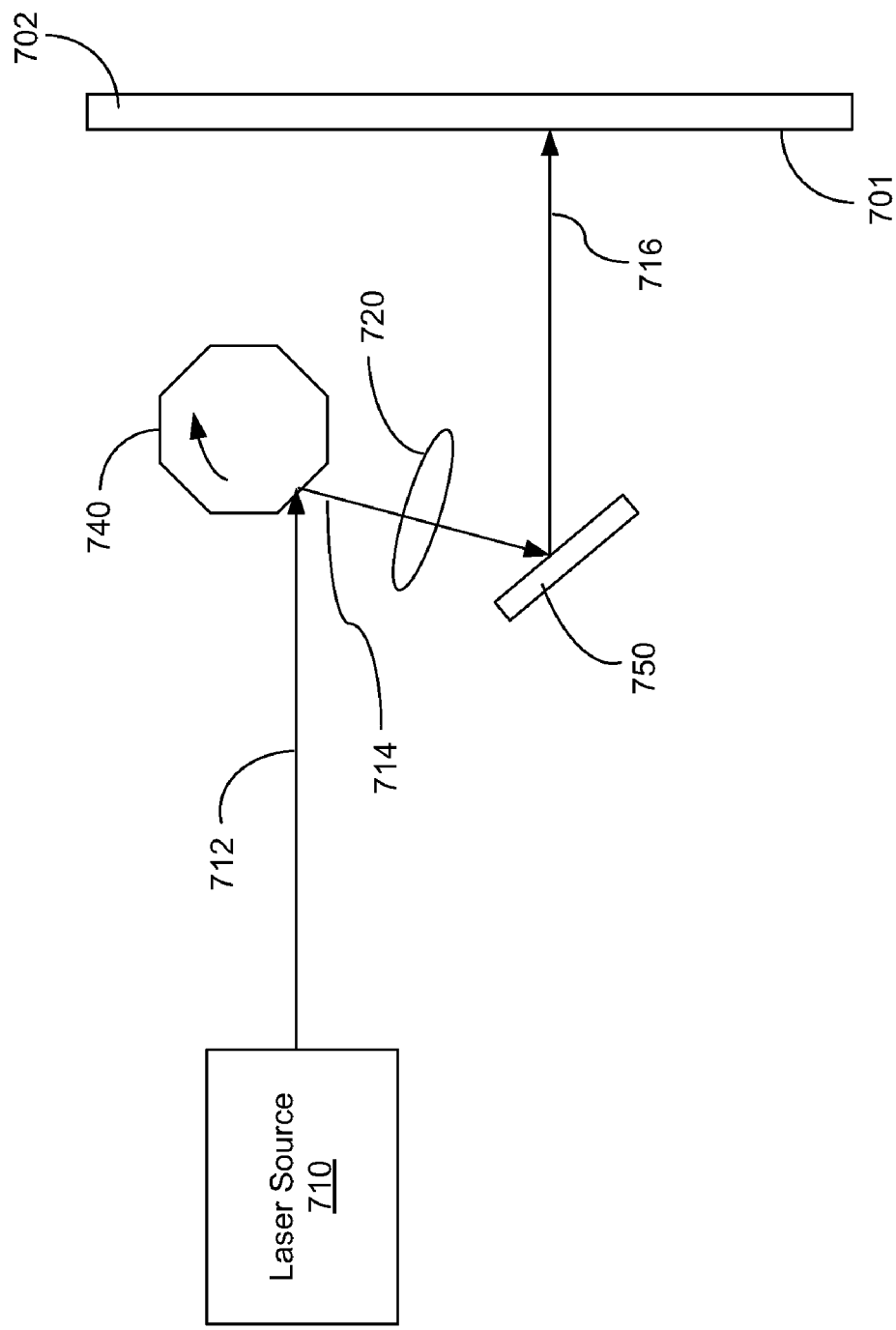
Figure 7C:
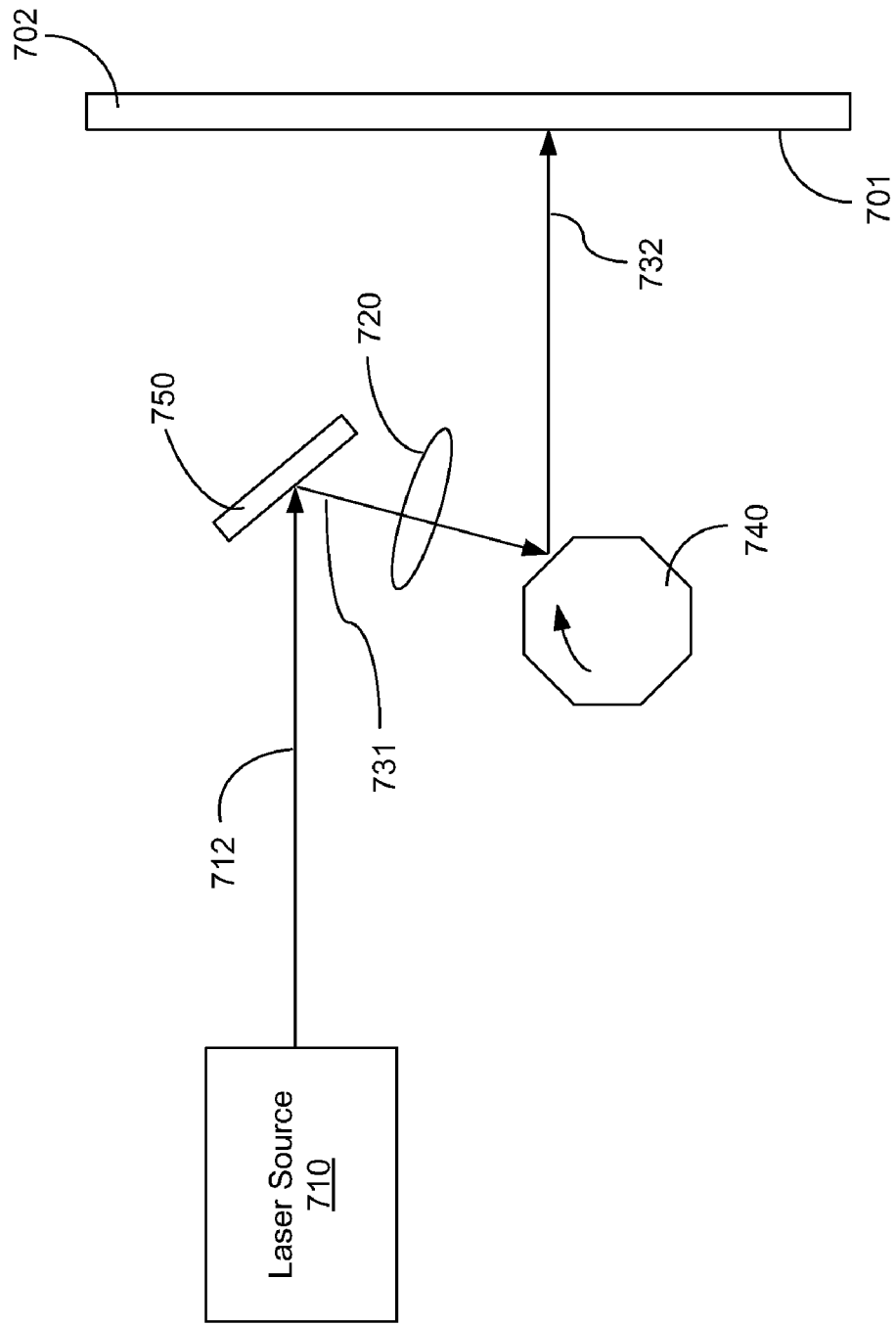

FIGS. 7A, 7B and 7C shows scanning beam systems that use two scanners: a polygon scanner with multiple reflective facets to provide horizontal scanning and a vertical scanning mirror such as a galvo-driven mirror to provide vertical scanning. A laser source 710 is provided to produce at least one laser beam 712. Depending on the specific applications, this single beam can be a beam of a particular wavelength, e.g., a visible color, UV light or other wavelengths. In some applications, multiple beams 712 may be generated from the laser source 710 and are scanned. In some implementations, the different beams 712 may be of different wavelengths, e.g., red, green and blue colors in the visible range, while in other implementations, the different beams 712 may be of the same or similar wavelengths, e.g., UV light. Two scanners, a polygon horizontal scanner 740 and a vertical scanner 750, are used to scan the beams 712 as 2-D scanning beams 716 onto a surface 701 on a target device 702, e.g., a screen. The vertical scanner 750 can be implemented by using the present flexure-based actuator-mirror assembly. In operation, one facet of the polygon scanner 740 scans one horizontal line as the polygon scanner 740 spins to change the orientation and position of the facet and the next facet scans the next horizontal line. The horizontal scanning and the vertical scanning are synchronized to each other to project images on the screen 702. Such a two-scanner optical scanning system can be in a pre-objective optical design as shown in FIG. 7A where a scan lens 760 is placed in the optical path downstream from the polygon scanner 740 and the vertical scanner 750 to focus a scanning beam onto the target surface 701, e.g., a screen. Because the scan lens 760 is positioned downstream from the polygon scanner 740 and the vertical scanner 750, the beam entering the scan lens 760 is scanned along the vertical and horizontal directions. Therefore, the scan lens 760 is designed to focus the 2-dimensionally scanned beam onto the target surface. In this example, the vertical scanner 750 is placed upstream from the polygon scanner 740. Alternatively, the order of the two scanners 740 and 750 may be reversed.

FIGS. 7B and 7C show two example implementations of a post-objective scanning system where a scan lens is placed in an optical path between the two scanners. In the example in FIG. 7B, the first scanner is the polygon scanner 740. The beam 712 is scanned along the first direction (e.g., the horizontal direction) by the polygon scanner 740 as a 1-D scanning beam 714. The second scanner downstream from the polygon scanner 740 is the vertical scanner 750, e.g., a galvo mirror constructed by engaging a mirror to a galvanometer and operates to scan the horizontally scanning beam 714 along the vertical direction as a 2-D scanning beam 116 to a target surface 701. A scan lens 720 is placed between the two scanners 740 and 750. In this post-objective design, the scan lens 720 can be structured to have high optical performance in focusing the 1-D scanning beam 114 along the scanning direction of the first scanner 140 only. Hence, such a scan lens does need to exhibit high optical performance along the second scanning direction (i.e., the vertical direction in this example) because the beam 714 is not scanned along the second scanning direction at the position of the scan lens 720. Therefore, the scan lens 720 can be a 1-D scan lens, e.g., a 1-D f theta lens. Due to the design of the scan lens 720, the focusing of the beam 116 on the target surface 701 does not change with the horizontal scanning. In addition, the vertical scanner 750 in FIG. 7B scans at a much smaller rate as the second scanner than the scan rate of the first horizontal scanner 740 and thus a focusing variation caused by the vertical scanning on the target surface 701 varies with time at the slower vertical scanning rate. This allows a focusing adjustment mechanism to be implemented in the system of FIG. 7B with the lower limit of a response speed at the slower vertical scanning rate rather than the high horizontal scanning rate. In practical devices, this particular arrangement of two scanners 740 and 750 allows easy implementation of the dynamic focusing adjustment to maintain the proper focusing of the 2-D scanning beam on the target surface as the vertical scanner 750 scans along the vertical direction.

When multiple beams 712 are used, each facet of the polygon scanner 740 simultaneously reflects the horizontal scan for a number of laser beams on the surface 701. The surface 701 is divided into a number of swath regions and each region corresponds to one polygon facet. In one implementation, multiple passes of the polygon scanner 740 can be used for the horizontal scanning with the beams at one vertical level for one pass and a slight vertical position offset for the next pass to achieve a vertical resolution set by the vertical position offset. The vertical scanner 750 is used to generate this slight vertical position offset. Assuming the polygon scanner 740 rotates once every 4.16 msec, then the vertical scanner 750 tilts one direction or the opposite direction once per revolution of the polygon scanner 740, e.g., once per 4.16 msec in the example in FIG. 6.

FIG. 7C illustrates an example of a post-objective scanning system where the vertical scanner 750 is upstream to the polygon scanner 740. The laser beam 712 from the laser 710 is directed to the vertical scanner 750 which scans the beam in the vertical direction as the 1-D scanning beam 731 and directs the beam 731 through the scan lens 720 to the downstream polygon scanner 740. The output beam 732 from the polygon scanner 740 is a 2-D scanning beam and is directed to the target surface 701. In one implementation, the scan lens 720 can be designed to image the reflective surface of the vertical scanner 750 onto the reflecting facet of the polygon scanner 740 so that a relatively small polygon facet of a compact polygon can be used to reduce power consumption and the dynamic range of the polygon.

The scanning-beam systems described above can be configured as display systems with either a passive screen or active screen as the target device 702. A passive screen does not emit light but makes light of the one or more scanning beams visible to a viewer by one or a combination of mechanisms, such as optical reflection, optical diffusion, optical scattering and optical diffraction. For example, a passive screen can reflect or scatter received scanning beam(s) to show images. An active screen emits light by absorbing the one or more scanning beams and the emitted light forms part of or all of the light that forms the displayed images. Such an active screen may include one or more fluorescent materials to emit light under optical excitation of the one or more scanning beams received by the screen to produce images. Screens with phosphor materials under excitation of one or more scanning excitation laser beams are described here as specific implementation examples of optically excited fluorescent materials in various system.

FIG. 8 shows an example of a scanning beam display system that use a fluorescent screens with fluorescent materials to emit light under optical excitation to produce images. Various screen designs with fluorescent materials can be used. In one implementation, for example, three different color phosphors that are optically excitable by the laser beam to respectively produce light in red, green, and blue colors suitable for forming color images can be formed on the screen as repetitive red, green and blue phosphor stripes in parallel. Various examples described in this application use screens with parallel color phosphor stripes for emitting light in red, green, and blue to illustrate various features of the laser-based displays. Phosphor materials are one type of fluorescent materials. Various described systems, devices and features in the examples that use phosphors as the fluorescent materials are applicable to displays with screens made of other optically excitable, light-emitting, non-phosphor fluorescent materials. At least one scanning laser beam is used to excite color light-emitting materials deposited on a screen to produce color images. The scanning laser beam is modulated to carry images in red, green and blue colors or in other visible colors and is controlled in such a way that the laser beam excites the color light-emitting materials in red, green and blue colors with images in red, green and blue colors, respectively. Hence, the scanning laser beam carries the images but does not directly produce the visible light seen by a viewer. Instead, the color light-emitting fluorescent materials on the screen absorb the energy of the scanning laser beam and emit visible light in red, green and blue or other colors to generate actual color images seen by the viewer. The excitation optical beam that excites a fluorescent material on the screen can be at a frequency or in a spectral range that is higher in frequency than the frequency of the emitted visible light by the fluorescent material. Accordingly, the excitation optical beam may be in the violet spectral range and the ultra violet (UV) spectral range, e.g., wavelengths under 420 nm.

In FIG. 8, the laser-based display system uses a screen having color phosphor stripes. Alternatively, color phosphor dots may also be used to define the image pixels on the screen. The system includes a laser module 810 to produce and project at least one scanning laser beam 820 onto a screen 801. The screen 801 has parallel color phosphor stripes in the vertical direction where red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 8 as red, green and blue. Other color sequences may also be used. The laser beam 820 is at the wavelength within the optical absorption bandwidth of the color phosphors and is usually at a wavelength shorter than the visible blue and the green and red colors for the color images. As an example, the color phosphors may be phosphors that absorb UV light in the spectral range from about 380 nm to about 420 nm to produce desired red, green and blue light. The laser module 810 can include one or more lasers such as UV diode lasers to produce the beam 820, a beam scanning mechanism to scan the beam 820 horizontally and vertically to render one image frame at a time on the screen 801, and a signal modulation mechanism to modulate the beam 820 to carry the information for image channels for red, green and blue colors. Such display systems may be configured as rear scanner systems where the viewer and the laser module 110 are on the opposite sides of the screen 101. Alternatively, such display systems may be configured as front scanner systems where the viewer and laser module 110 are on the same side of the screen 801.

This scanning display system can be calibrated during the manufacture process so that the on-off timing of the optical pulses carried by the scanning laser beam 820 and position of the laser beam 820 relative to the fluorescent stripes in the screen 801 are known and are controlled within a permissible tolerance margin in order for the system to properly operate with specified image quality. However, the screen 801 and components in the laser module 810 of the system can change over time due to various factors, such as scanning device jitter, changes in temperature or humidity, changes in orientation of the system relative to gravity, settling due to vibration, aging and others. Notably, such changes can produce visible and, often undesirable, effects on the displayed images. For example, a laser pulse in the scanning excitation beam 820 may hit a subpixel that is adjacent to an intended target subpixel for that laser pulse due to a misalignment of the scanning beam 820 relative to the screen 801 along the horizontal scanning direction. When this occurs, the coloring of the displayed image is changed from the intended coloring of the image. Hence, a red flag in the intended image may be displayed as a green flag on the screen. For another example, a laser pulse in the scanning excitation beam 820 may hit both the intended target subpixel and an adjacent subpixel next to the intended target subpixel due to a misalignment of the scanning beam 820 relative to the screen along the horizontal scanning direction. When this occurs, the coloring of the displayed image is changed from the intended coloring of the image and the image resolution deteriorates. The visible effects of these changes can increase as the screen display resolution increases because a smaller pixel means a smaller tolerance for a change in position. In addition, as the size of the screen increases, the effect of a change that can affect the alignment can be more pronounced because a large moment arm associated with a large screen means that an angular error can lead to a large position error on the screen. For example, if the laser beam position on the screen for a known beam angle changes over time, the result is a color shift in the image. This effect can be noticeable and thus undesirable to the viewer.

The system in FIG. 8 implements a feedback control mechanism to maintain proper alignment of the scanning beam 820 on the desired sub-pixel to achieved desired image quality. An optical sensing module 830 is provided to receive feedback light that is emitted by the screen 801 under optical excitation of the excitation beam 820 and represents the position and other properties of the scanning beam 820 on the screen 801. The optical sensing unit 830 produces a feedback servo signal 832 to a servo control in the laser module 810 that processes this feedback servo signal 832 to extract the information on the beam positioning and other properties of the beam on the screen 801. The servo control adjusts the direction and other properties of the scanning beam 820 to ensure the proper operation of the display system.

The optical sensing unit 830 may be on the screen 801 or off the screen 801 and includes at least one optical detector to detect one of the red, green and blue light emitted from the screen 801. In the illustrated example, three optical detectors PD1, PD2 and PD3 are provided in the sensing unit 830 to detect the red, green and blue fluorescent light, respectively. Each optical detector is designed to receive light from a part of or the entire screen. A bandpass optical filter can be placed in front of each optical detector to select a designated color while rejecting light of other colors. Examples of feedback controls for such scanning display systems are disclosed in PCT publication No. WO 2007/095329 entitled "SERVO-ASSISTED SCANNING BEAM DISPLAY SYSTEMS USING FLUORESCENT SCREENS" and published on Aug. 23, 2007, which is incorporated by reference as part of the disclosure of this document.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. Variations and enhancements of the disclosed implementations and other implementations can be made based on what is described and illustrated in this document.

What is claimed is:

1. An actuator device, comprising:
   a support base;
   a first flexure comprising a first flexure base that is fixed to the support base and first flexure extensions that flex with respect to the fixed first flexure base and the support base;
   a second flexure comprising a second flexure base that is fixed to the support base and one or more second flexure extensions that flex with respect to the fixed second flexure base and the support base, the second flexure positioned and oriented to have the first and second flexure extensions to cross; and
   an actuator engaged to distal ends of the first and second flexure extensions to rotate around a single rotation axis as the first and second flexure extensions deform when the actuator is actuated to rotate.

2. The device as in claim 1, wherein:
   the actuator comprises a conductor coil engaged to distal ends of the first and second flexure extensions to rotate around the single rotation axis as the first and second flexure extensions deform when an electrical current in the conductor coil electromagnetically interacts with a magnetic field present at the conductor coil.

3. The device as in claim 2, wherein:
   the support base comprises a magnetic module that produces the magnetic field at the conductor coil.

4. The device as in claim 2, comprising:
   a magnet module fixed in location relative to the support base to produce the magnetic field at the conductor coil to electromagnetically cause the conductor coil to rotate around the single rotation axis in response to the electrical current in the conductor coil.

5. The device as in claim 4, wherein:
   the magnet module comprises a Halbach magnet array that includes permanent magnets and a groove embedded in the permanent magnets to produce a high magnetic flux density, and one side of the conductor coil is placed inside the groove.

6. The device as in claim 4, wherein:
   the magnet module comprises two Halbach magnet arrays that are symmetrically located at two opposite sides of the conductor coil.

7. The device as in claim 2, wherein:
   the first and second flexures are electrically conductive and are electrically connected to the conductor coil to supply the electrical current to the conductor coil.

8. The device as in claim 1, wherein:
   the support base comprises a first protruded extension and a second protruded extension that are located at opposite sides of the actuator, the first protruded extension is spaced from a first side surface of the actuator and the second protruded extension is spaced from a second side surface of the actuator, and
   wherein the device comprises a first damper pad located between and in contact with the first protruded extension and the first side surface to dampen a motion of the actuator relative to the support base, and a second damper pad located between and in contact with the second protruded extension and the second side surface to dampen the motion of the actuator relative to the support base.

9. The device as in claim 1, comprising:
   a damper pad located between and in contact with the support base and a surface of the actuator to dampen a motion of the actuator relative to the support base.

10. The device as in claim 1, comprising:
    a mirror engaged to the actuator to rotate with the actuator around the single rotation axis and to redirect light incident to the mirror as the actuator rotates.

11. The device as in claim 10, comprising:
    a laser diode spaced from the support base to produce a monitor laser beam to the mirror;
    a position sensitive detector spaced from the support base and the laser diode to receive the monitor laser beam reflected from the mirror and to measure a position of the reflected monitor laser beam; and an actuator control module that receives a detector output from the position sensitive detector and controls the actuator to set the mirror at a desired orientation based on the measured position of the reflected monitor laser beam on the position sensitive sensor.

12. The device as in claim 11, comprising:

an actuator frame on which the support base, the magnet module, the diode laser and the position sensitive detector are mounted with fixed positions relative to one another to provide a known relationship between a beam position of the reflected monitor laser beam on the position sensitive detector and an orientation of the mirror.

13. The device as in claim 11, comprising:

a mechanism to direct an input laser beam onto the mirror to redirect the input laser beam by reflection at the mirror that is set at a desired mirror orientation by the actuator control module.

14. The device as in claim 1, wherein:

the first flexure extensions are spaced along a direction parallel to the single rotation axis.

15. The device as in claim 14, wherein:

the distal ends of the first flexure extensions that are engaged to the actuator are located above the second flexure base; and the distal ends of the second flexure extensions that are engaged to the actuator are located above the first flexure base.

16. An actuator device, comprising:

a conductor coil electrically connected to receive and carry an electrical current which electromagnetically interacts with a magnetic field present at the conductor coil to move the conductor coil;

a coil support that is engaged to the conductor coil to confine movement of the conductor coil as a rotation around a rotation axis;

a first Halbach magnet array of first permanent magnets located at a first side of the coil support to produce a first high magnetic flux density at a first side of the conductor coil; and a second Halbach magnet array of second permanent magnets located at a second, opposite side of the coil support to produce a second high magnetic flux density at a second side of the conductor coil, the first and second Halbach magnet arrays operating collectively to rotate the conductor coil around the rotation axis.

17. The device as in claim 16, wherein:

the first permanent magnets of the first Halbach magnet array are arranged to form a first groove embedded in the first permanent magnets and the first side of the conductor coil is located inside the first groove; and the second permanent magnets of the second Halbach magnet array are arranged to form a second groove embedded in the second permanent magnets and the second side of the conductor coil is located inside the second groove.

18. The device as in claim 16, wherein:

the coil support includes two flexures that are crossed with each other and are engaged to the conductor coil to confine the movement of the conductor coil to rotate around a location where the two flexures are crossed.

* * * * *